US012559238B2

(12) United States Patent
Princip et al.

(10) Patent No.: US 12,559,238 B2
(45) Date of Patent: Feb. 24, 2026

(54) CONFIGURABLE MULTI-CLASS PASSENGER SEAT ASSEMBLY

(71) Applicant: B/E Aerospace, Inc., Winston-Salem, NC (US)

(72) Inventors: Michael Princip, Winston-Salem, NC (US); Alexander Velet, Clemmons, NC (US); Charles Martin Hansson, Winston-Salem, NC (US); Travis Vaninetti, Bothell, WA (US); Daniel Mills, Pilot Mountain, NC (US); James Kash, Winston-Salem, NC (US); Ferhad Tabakovic, Winston-Salem, NC (US); Travis Finlay, Winston-Salem, NC (US); Brian Green, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/734,130

(22) Filed: Jun. 5, 2024

(65) Prior Publication Data

US 2024/0409218 A1      Dec. 12, 2024

Related U.S. Application Data

(60) Provisional application No. 63/471,415, filed on Jun. 6, 2023.

(51) Int. Cl.
*B64D 11/06* (2006.01)

(52) U.S. Cl.
CPC ...... *B64D 11/0605* (2014.12); *B64D 11/0606* (2014.12); *B64D 11/0636* (2014.12);
(Continued)

(58) Field of Classification Search
CPC ............ B64D 11/0605; B64D 11/0606; B64D 11/0636; B64D 11/0638; B64D 11/064;
(Continued)

(56) References Cited

U.S. PATENT DOCUMENTS 3,142,461 A      7/1964   Tomlinson
3,381,921 A      5/1968   Mcdonough et al.
(Continued)

FOREIGN PATENT DOCUMENTS

EP         2234884 B1     2/2012
EP         3620377 A1 *   3/2020   ............... B60N 2/01
FR         3095190 A1    10/2020

OTHER PUBLICATIONS

European Search Report received in EP Application No. 24180569.6, Feb. 14, 2025, 14 pages.
(Continued)

*Primary Examiner* — Assres H Woldemaryam
(74) *Attorney, Agent, or Firm* — Suiter Swantz IP

(57) ABSTRACT

A passenger seat assembly includes a first seat, a second seat, and a center console. In embodiments, a privacy divider is positioned atop the center console and serves as a mounting location for amenities for serving the first and second passenger seats. The center console is configurable to include various privacy, comfort, and utility features depending on the intended seating class for the passenger seat assembly. In embodiments, the first and second passenger seats include headrests and privacy assemblies associated with the headrests for enhancing privacy between the seats and/or relative to adjacent aisles.

13 Claims, 19 Drawing Sheets

(52) U.S. Cl.
CPC ........ B64D 11/0638 (2014.12); B64D 11/064 (2014.12); B64D 11/0642 (2014.12); B64D 11/0644 (2014.12)

(58) Field of Classification Search
CPC ............ B64D 11/0642; B64D 11/0644; B64D 11/00155; B64D 11/0023; B64D 2011/0053; B64D 11/0646; B64D 11/0696; B60N 2/0228; B60N 2/79; B60N 2/885; B60N 3/002; B61D 33/005
See application file for complete search history.

(56) References Cited

U.S. PATENT DOCUMENTS

| | | | |
|---|---|---|---|
| 3,486,204 A | 12/1969 | Miller, Jr. et al. | |
| 3,578,274 A | 5/1971 | Ginn et al. | |
| 4,809,897 A * | 3/1989 | Wright, Jr. | B60R 7/04 |
| | | | 224/539 |
| 4,936,620 A | 6/1990 | Francois et al. | |
| 6,059,364 A | 5/2000 | Dryburgh et al. | |
| 6,347,590 B1 * | 2/2002 | D'Annunzio | B60N 3/002 |
| | | | 297/145 |
| 6,669,141 B2 | 12/2003 | Schmidt-Schaeffer | |
| 7,156,346 B2 | 1/2007 | Mercier | |
| 7,252,268 B2 | 8/2007 | Saint-Jalmes | |
| 7,367,528 B2 | 5/2008 | Allison, Sr. | |
| 7,568,759 B2 * | 8/2009 | Schurg | B64D 11/0606 |
| | | | 297/188.16 |
| 7,578,470 B2 | 8/2009 | Plant | |
| 8,196,864 B2 | 6/2012 | Ruiter et al. | |
| 8,196,985 B2 * | 6/2012 | Penner | B60R 7/04 |
| | | | 296/24.34 |
| 8,382,036 B2 | 2/2013 | Ruiter et al. | |
| 8,662,447 B2 | 3/2014 | Johnson et al. | |
| 8,807,481 B2 * | 8/2014 | Plant | B64D 11/0604 |
| | | | 244/118.6 |
| 8,944,379 B2 | 2/2015 | Orson et al. | |
| 8,998,139 B2 | 4/2015 | Dryburgh et al. | |
| 9,446,848 B2 | 9/2016 | Jerome et al. | |
| 9,550,573 B2 | 1/2017 | Ersan et al. | |
| 9,617,001 B2 * | 4/2017 | Zimmermann | B64D 11/0015 |
| 9,828,099 B2 | 11/2017 | Henshaw et al. | |
| 10,494,101 B2 * | 12/2019 | Wilson | B64D 11/0642 |
| 10,632,933 B2 * | 4/2020 | Line | B60N 2/01 |
| 10,723,462 B2 | 7/2020 | Ehlers et al. | |
| 11,034,453 B1 * | 6/2021 | Malecha | B64D 11/0638 |
| 11,066,170 B2 * | 7/2021 | Pozzi | B64D 11/00151 |
| 11,147,384 B1 * | 10/2021 | Lopez Ramirez | A47C 1/12 |
| 11,401,038 B1 * | 8/2022 | Warwick | B64D 11/064 |
| 11,465,749 B1 * | 10/2022 | Lawson | B64D 11/0605 |
| 11,597,522 B2 | 3/2023 | Frost | B64D 11/0638 |
| 2004/0195451 A1 | 10/2004 | Bentley et al. | |
| 2005/0151405 A1 | 7/2005 | Dowty et al. | |
| 2005/0268319 A1 * | 12/2005 | Brady, Jr. | B60N 2/797 |
| | | | 725/77 |
| 2006/0086864 A1 | 4/2006 | Beroth | |
| 2007/0034742 A1 | 2/2007 | Jaeger et al. | |
| 2007/0085389 A1 * | 4/2007 | Schurg | B64D 11/0644 |
| | | | 297/184.1 |

| | | | |
|---|---|---|---|
| 2007/0246981 A1 | 10/2007 | Plant | |
| 2009/0146004 A1 | 6/2009 | Plant | |
| 2009/0302158 A1 | 12/2009 | Darbyshire et al. | |
| 2010/0065683 A1 | 3/2010 | Darbyshire | |
| 2010/0065684 A1 | 3/2010 | Ruiter et al. | |
| 2012/0112500 A1 | 5/2012 | Rundle et al. | |
| 2012/0146372 A1 | 6/2012 | Ferry | |
| 2012/0223186 A1 | 9/2012 | Henshaw | |
| 2012/0292957 A1 | 11/2012 | Vergnaud et al. | |
| 2013/0068887 A1 | 3/2013 | Ko | |
| 2014/0035330 A1 | 2/2014 | Henshaw | |
| 2014/0215534 A1 * | 7/2014 | Meckes | B64D 11/00 |
| | | | 725/75 |
| 2014/0283296 A1 | 9/2014 | Jerome et al. | |
| 2014/0306500 A1 | 10/2014 | Dryburgh et al. | |
| 2015/0001341 A1 | 1/2015 | Ersan et al. | |
| 2015/0191111 A1 * | 7/2015 | Marini | B64D 11/0644 |
| | | | 297/411.3 |
| 2015/0274299 A1 * | 10/2015 | Henshaw | B64D 11/0606 |
| | | | 244/118.6 |
| 2015/0321592 A1 * | 11/2015 | De Morais | B64D 11/0638 |
| | | | 297/135 |
| 2015/0367942 A1 | 12/2015 | Parry et al. | |
| 2016/0207468 A1 * | 7/2016 | Fesenmyer | B60N 2/773 |
| 2016/0355109 A1 * | 12/2016 | Geraty | B60N 2/90 |
| 2017/0015420 A1 * | 1/2017 | Henshaw | B64D 11/0606 |
| 2017/0088267 A1 | 3/2017 | Dowty et al. | |
| 2017/0129611 A1 | 5/2017 | Morgan | |
| 2017/0233057 A1 * | 8/2017 | Charles | B64D 11/0604 |
| | | | 244/122 R |
| 2017/0240283 A1 | 8/2017 | Dowty | |
| 2017/0259921 A1 | 9/2017 | Valdes De La Garza et al. | |
| 2017/0341754 A1 * | 11/2017 | Gross | B64D 11/0696 |
| 2018/0022458 A1 | 1/2018 | Weifenbach | |
| 2018/0029712 A1 | 2/2018 | Sieben et al. | |
| 2018/0029713 A1 | 2/2018 | Weifenbach | |
| 2018/0281964 A1 | 10/2018 | Carlioz et al. | |
| 2018/0370635 A1 * | 12/2018 | Itzinger | B64D 11/0648 |
| 2019/0061955 A1 * | 2/2019 | Wilson | B64D 11/0646 |
| 2019/0077512 A1 | 3/2019 | Bentley et al. | |
| 2019/0092475 A1 | 3/2019 | Carlioz et al. | |
| 2019/0193860 A1 * | 6/2019 | Ehlers | B64D 11/0601 |
| 2019/0217957 A1 * | 7/2019 | Wilson | B60N 2/809 |
| 2019/0241269 A1 | 8/2019 | Martin et al. | |
| 2019/0276151 A1 | 9/2019 | Dryburgh | |
| 2019/0308731 A1 | 10/2019 | Pozzi et al. | |
| 2019/0315467 A1 | 10/2019 | Nicholas | |
| 2020/0055436 A1 * | 2/2020 | Garcia Sanchez | B60R 21/026 |
| 2020/0108934 A1 | 4/2020 | Williamson et al. | |
| 2020/0156794 A1 | 5/2020 | Dowty et al. | |
| 2020/0369389 A1 * | 11/2020 | Dowty | B64D 11/06395 |
| 2020/0385125 A1 * | 12/2020 | Dowty | B64D 11/0601 |
| 2021/0269163 A1 | 9/2021 | Woodington | |
| 2021/0371112 A1 * | 12/2021 | Wisniewski | B64D 11/0606 |
| 2022/0033083 A1 | 2/2022 | Chareyre et al. | |
| 2022/0106044 A1 | 4/2022 | Pence et al. | |

OTHER PUBLICATIONS

European Patent Office, Extended European Search Report received in EP Application No. 24180556.3, Oct. 22, 2024, 6 pages.

* cited by examiner

100

CONFIGURABLE MULTI-CLASS PASSENGER SEAT ASSEMBLY

CROSS-REFERENCE TO RELATED APPLICATION

This nonprovisional application claims the benefit of priority of U.S. Application No. 63/471,415 filed Jun. 6, 2023 for CONFIGURABLE MULTI-CLASS PASSENGER SEAT ASSEMBLY, which is hereby incorporated by reference in its entirety.

TECHNICAL FIELD AND BACKGROUND

The present disclosure relates generally to passenger seats for airliners and other conveyances, and more particularly, to an integrated passenger seat assembly including two seats, a center console, and various privacy, utility, and comfort features available in different configurations depending on the carrier and/or intended seating class for the seat assembly.

Many passenger cabins include separate economy and premium seating classes. Passenger seats may differ between the seating classes, wherein economy class seats are designed to maximize seat density, and premium class seats are designed to maximize comfort. Each seat within the same seating class is typically the same in terms of adjustability, comfort, privacy, and included features.

In some instances, a carrier may want different seat configurations within the same seating class. For example, a carrier may want to enhance privacy only for those seats positioned in or near high-traffic areas, include certain features based on the location of the seat within a seating class, or add features to some seats to generate additional revenue. In other instances, a carrier may want to use the same basic seat design in different seating classes, but enhance certain features and relax others depending on the particular seating class. Traditional passenger seats are not easily reconfigured to provide variation desirable to carriers.

Therefore, what is needed is a passenger seat assembly that is easily reconfigurable in terms of comfort, privacy, and included features.

BRIEF SUMMARY

In one aspect, embodiments of the inventive concepts disclosed herein are directed to a passenger seat assembly including a first passenger seat including a first headrest and a first privacy provision associated with the first headrest, a second passenger seat including a second headrest and a second privacy provision associated with the second headrest, and a center console positioned between the first passenger seat and the second passenger seat. In embodiments, the center console includes a first armrest serving the first passenger seat, a second armrest serving the second passenger seat and a fixed table positioned forward of the first and second armrests.

In some embodiments, the passenger seat assembly further includes an upwardly extending fixed privacy divider positioned atop the center console and between the first armrest and the second armrest, an upwardly extending movable privacy divider deployable in a forward direction relative to the upwardly extending fixed privacy divider, at least one first amenity mounted to a first side of the upwardly extending fixed privacy divider facing the first passenger seat, and at least one second amenity mounted to a second side of the upwardly fixed privacy divider facing the second passenger seat.

In some embodiments, the at least one first amenity includes at least one of an article holder and a reading light, and the at least one second amenity includes at least one of an article holder and a reading light.

In some embodiments, the center console further includes, on a first side of the center console facing the first passenger seat, a first cup holder positioned below the fixed table and a first open storage compartment positioned below the first armrest, and, on a second side of the center console facing the second passenger seat, a second cup holder positioned below the fixed table and a second open storage compartment positioned below the second armrest.

In some embodiments, a first remote control is removably mounted to the first side of the center console and positioned below the fixed table, at least one first power outlet is mounted in the first open storage compartment, a second remote control is removably mounted to the second side of the center console and positioned below the fixed table, and at least one second power outlet is mounted in the second open storage compartment.

In some embodiments, a first vertically adjustable armrest is positioned on an outboard side of the first passenger seat, a second vertically adjustable armrest is positioned on an outboard side of the second passenger seat, an end bay is positioned on an outboard side of the first passenger seat, and an elevated step is mounted in the end bay.

In some embodiments, a deployable table is mounted in the center console, the deployable table deployable through a forward end of the fixed table.

In some embodiments, the first and second passenger seats are positioned side-by-side and are parallel, the first and second passenger seats are mounted on a frame assembly including transverse beams and legs for mounting the passenger seat assembly to a floor, a first footwell is positioned under the first passenger seat, a second footwell is positioned under the second passenger seat, and at least one amenity is mounted on a backside of each of the first passenger seat and the second passenger seat.

In some embodiments, the first privacy provision is a first headrest privacy assembly mounted behind the first headrest, the first headrest privacy assembly including at least one laterally positioned panel that extends forward past the first headrest, and the second privacy provision is a second headrest privacy assembly mounted behind the second headrest, the second headrest privacy assembly including at least one laterally positioned panel that extends forward past the second headrest.

According to another aspect, embodiments of the inventive concepts disclosed herein are directed to a two-seat passenger seat assembly including a frame assembly, a first passenger seat mounted to the frame assembly, a second passenger seat mounted to the frame assembly, and a center console mounted to the frame assembly and positioned between the first passenger seat and the second passenger seat, the center console including a first armrest serving the first passenger seat, a second armrest serving the second passenger seat, and a fixed table positioned forward of the first and second armrests.

In some embodiments, at least one of the first passenger seat, the second passenger seat, and the center console are configured to be equipped with at least one of a privacy feature and a utility feature.

According to a further aspect, embodiments of the inventive concepts disclosed herein are directed to a passenger seat assembly for installation in an aircraft cabin, the passenger seat assembly including a frame assembly, a first passenger seat mounted to the frame assembly, a second passenger seat mounted to the frame assembly, a center console mounted to the frame assembly and positioned between the first passenger seat and the second passenger seat, an upwardly extending fixed privacy divider positioned atop the center console, an upwardly extending movable privacy divider deployable in a forward direction relative to the upwardly extending fixed privacy divider, at least one first amenity mounted to a first side of the upwardly extending fixed privacy divider facing the first passenger seat, and at least one second amenity mounted to a second side of the upwardly fixed privacy divider facing the second passenger seat.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
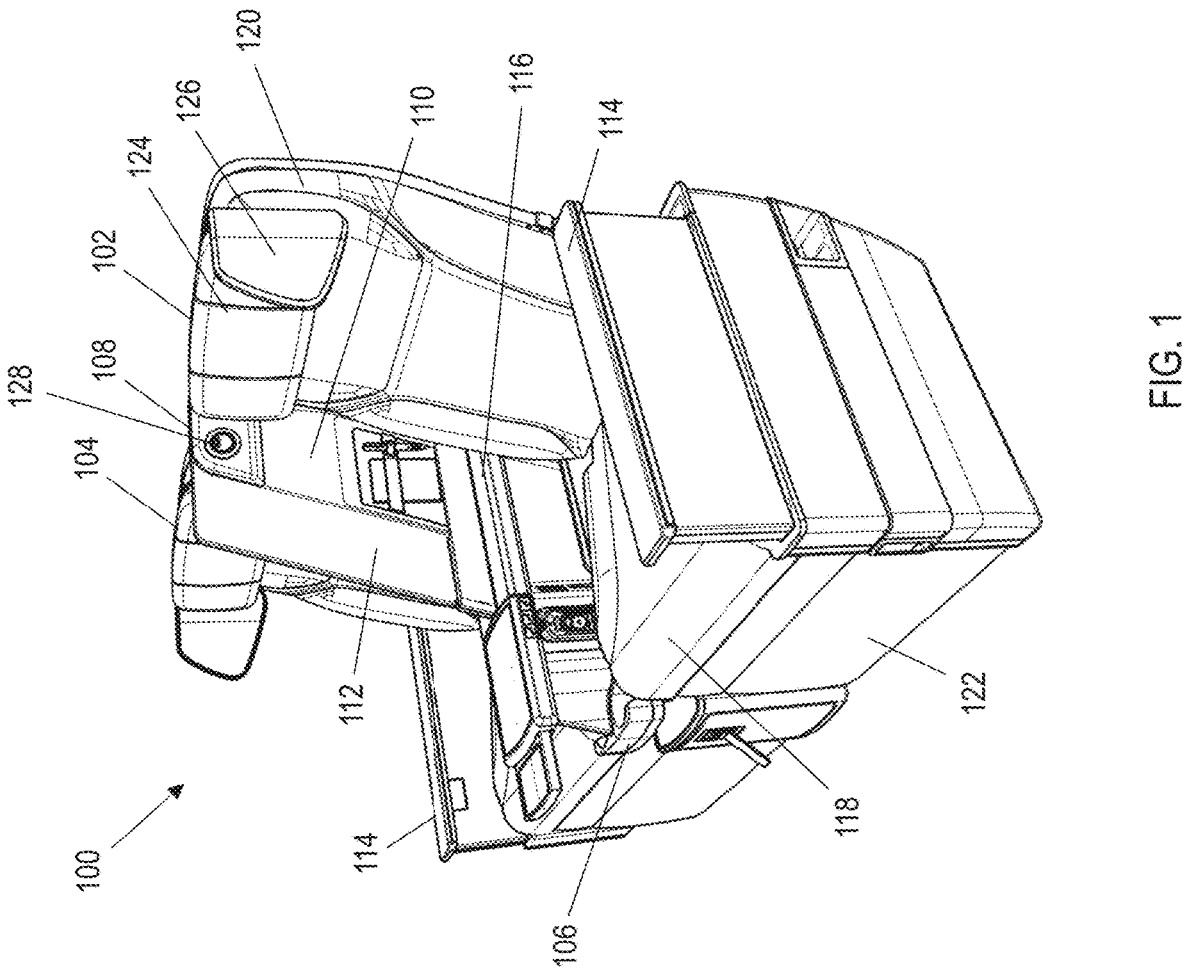
FIG. 1 is a front isometric view of a passenger seat assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to passenger seat assemblies for installation in, for example, airliners and other conveyances. In some embodiments, the passenger seat assembly is an integrated unit including a first seat, a second seat, and a center console positioned between the first and second seats. The first and second seats are positioned side-by-side, parallel, aligned, and face the same direction. The seat assembly may be installed in an aircraft passenger cabin, for instance in a business or premium seating class. The seat assembly may be installed to one side of an aircraft longitudinal aisle, between spaced aircraft longitudinal aisles, and in other locations. Each of the first and second seats is equipped with a headrest, and the headrest may be provided in different configurations depending on the desired degree of privacy. The headrest may further serve to mount other seat features, for instance a reading light. The center console is also configurable to include different features, controls, storage space, etc., and in some cases includes a privacy divider also configurable to include different features. A seat supplier may present different configuration options to a carrier who may choose a particular seat configuration based on preference, seat location within the aircraft, seat location relative to other seats, etc. The seat assembly is readily reconfigurable by interchanging certain components for others differently equipped.

FIG. 1 illustrates a passenger seat assembly 100 according to the present disclosure. In some embodiments, the seat assembly 100 is installable as an integrated unit including a first seat 102, a second seat 104, and a center console 106 positioned between the first and second seats 102, 104. In embodiments, the seat assembly 100 includes a privacy divider 108 positioned atop the center console 106. In some embodiments, the privacy divider 108 includes an upwardly extending portion 110 and a forward deploying portion 112 that may be stowed or deployed depending on passenger preference, phase of flight, etc. Each of the center console 106 and the privacy divider 108 includes a first lateral side facing the first seat 102, and a second lateral side facing the second seat 104. Each seat 102, 104 includes two armrests, wherein one armrest 114 is positioned at the lateral extend of the seat assembly 100 and the other armrest 116 is positioned on the center console 106. As such, the center console 106 includes a first armrest 116 serving the first seat 102, and a second armrest 116 serving the second seat 104. The outboard armrests 114 may be configured to raise and lower.

Each seat 102, 104 generally includes a seat bottom 118, a backrest 120, and a leg rest 122. In use, each seat component may be adjustable, and seat component movements may be coordinated to change the sitting position between upright and reclined through various intermediate sitting positions. In some embodiments, each seat 102, 104 may recline to lay flat depending on the seat pitch and adjustment capabilities of the seat. Each backrest 120 includes a headrest 124. As shown, each headrest 124 is configured as an asymmetrical headrest including, on the outboard side of the seat, a lateral privacy feature 126 that extends in a forward direction. Also as shown, the privacy divider 108 is configured with a reading light 128 mounted to each lateral side of the upwardly extending portion of the privacy divider 108 arranged facing its respective seat 102, 104.

Figure 2:
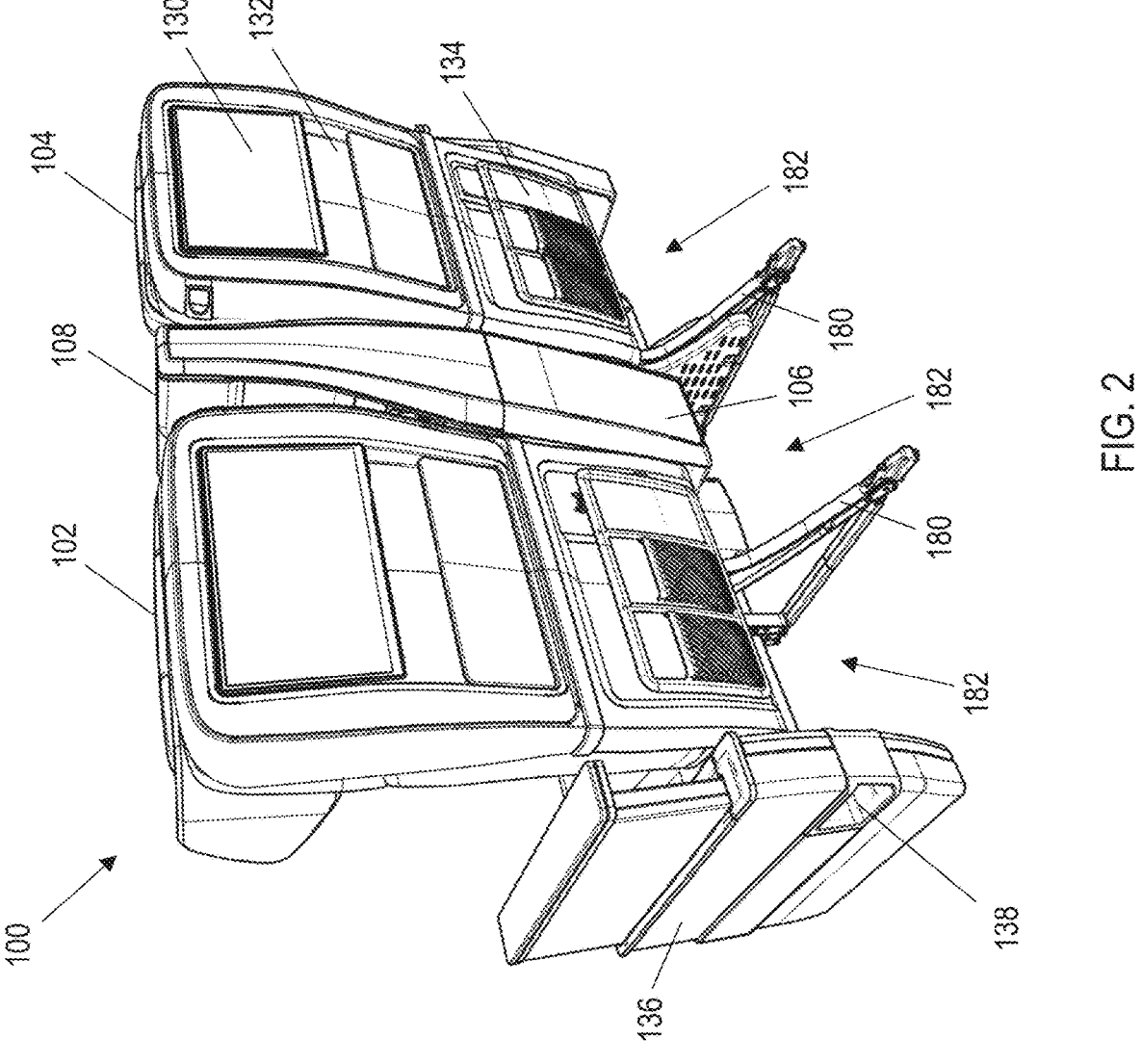
FIG. 2 is rear isometric view of the passenger seat assembly.

FIG. 2 illustrates the back of the passenger seat assembly 100. The backrest 120 of each seat 102, 104 may be used to mount a video monitor 130, a literature pocket 132, and various other storage pockets 134 and amenities for use by passengers seated in the next row. As shown, the center console 106 and the privacy divider 108 together substantially fill the space between the first and second seats 102, 104 to enhance privacy between seat rows. Also as shown, the outboard armrest housing 136 may include a step 138 for gaining access to overhead storage bins typically found in airliners. Legs 180 of the seat assembly 100 demarcate under seat footwells 182 for use by passengers in the next row.

Figure 3:
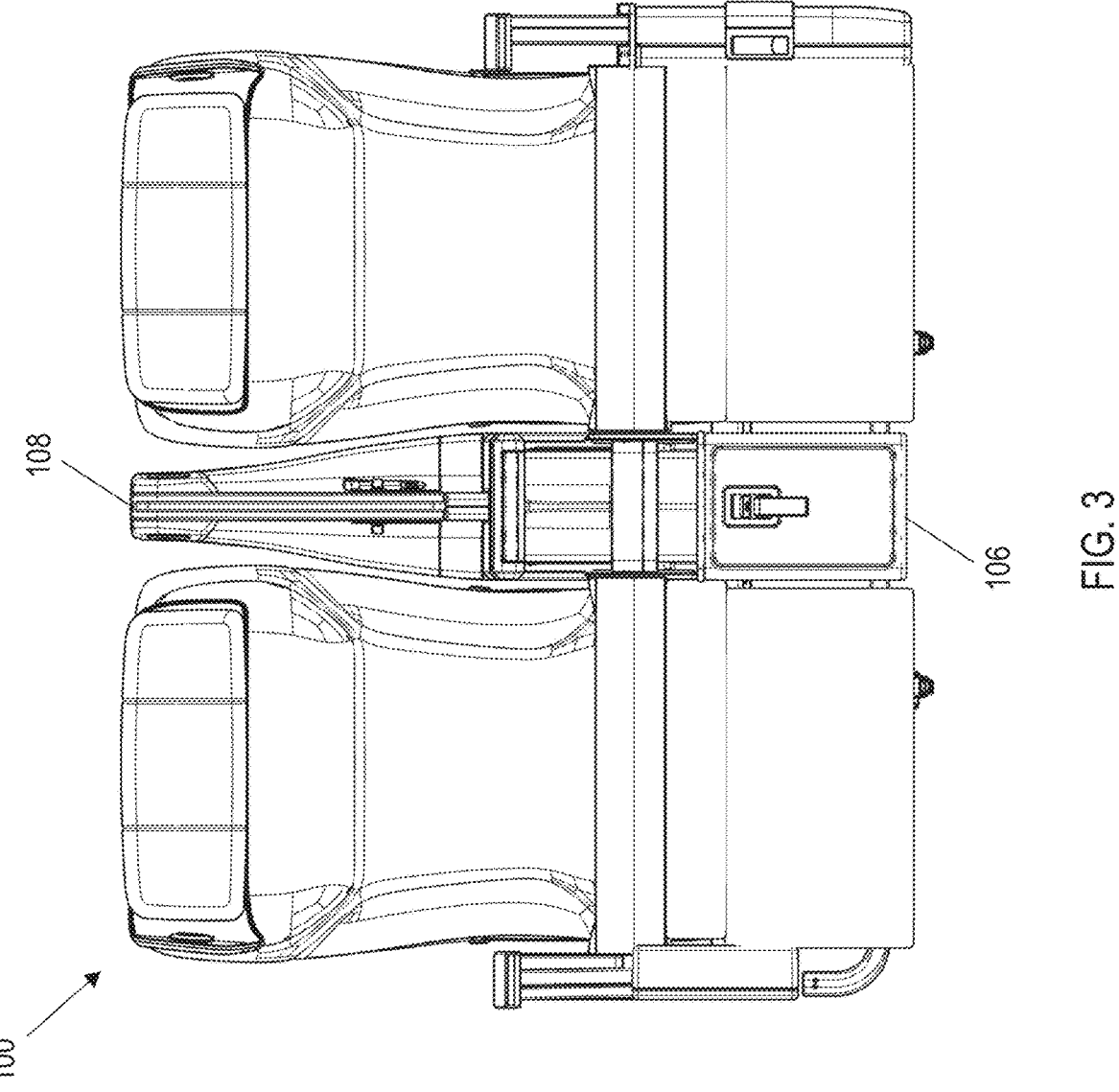
FIG. 3 is a front elevation view of the passenger seat assembly.
Figure 4:
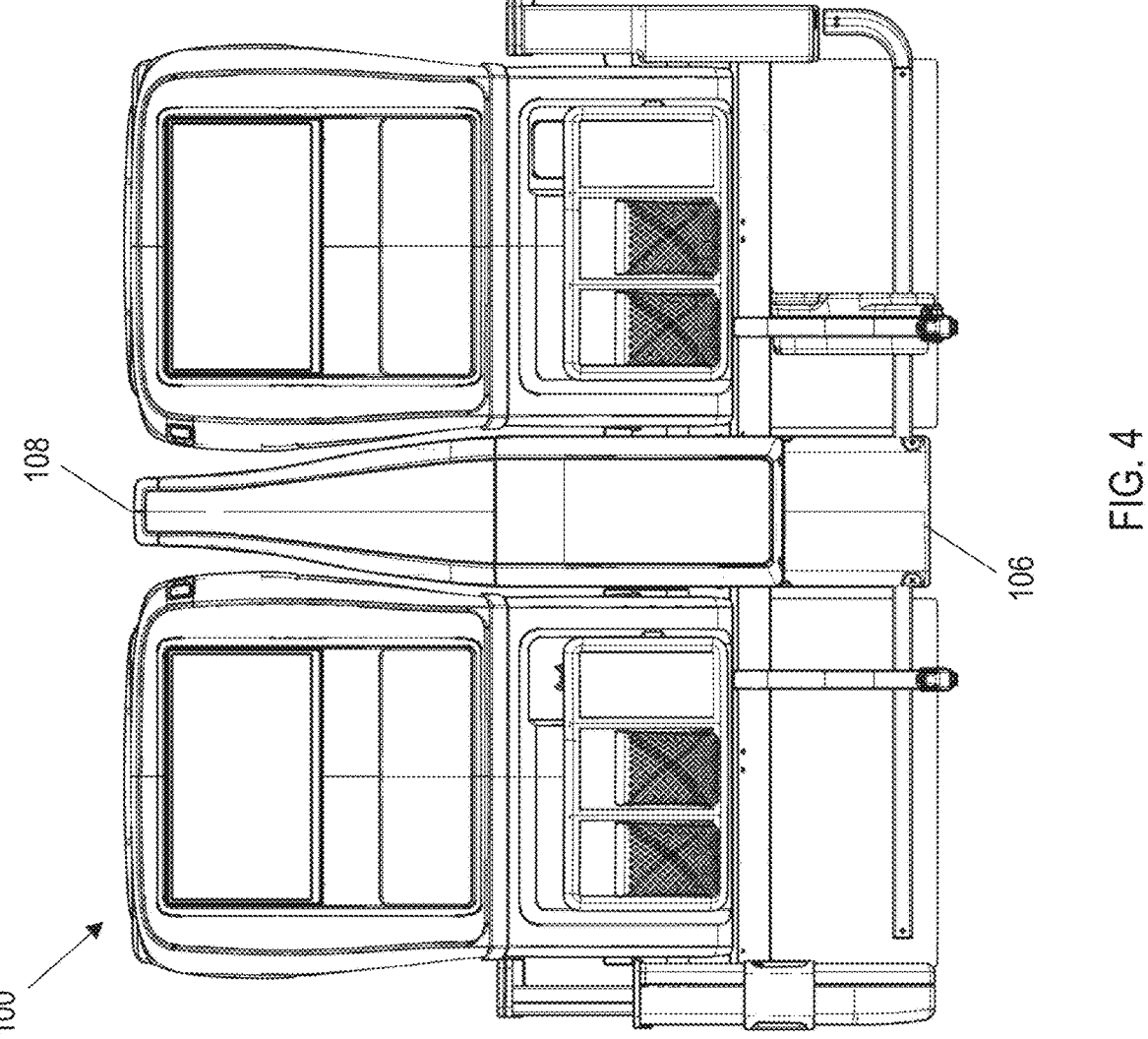
FIG. 4 is a rear elevation view of the passenger seat assembly.
Figure 5:
FIG. 5 is a left side view of the passenger seat assembly.
Figure 5:
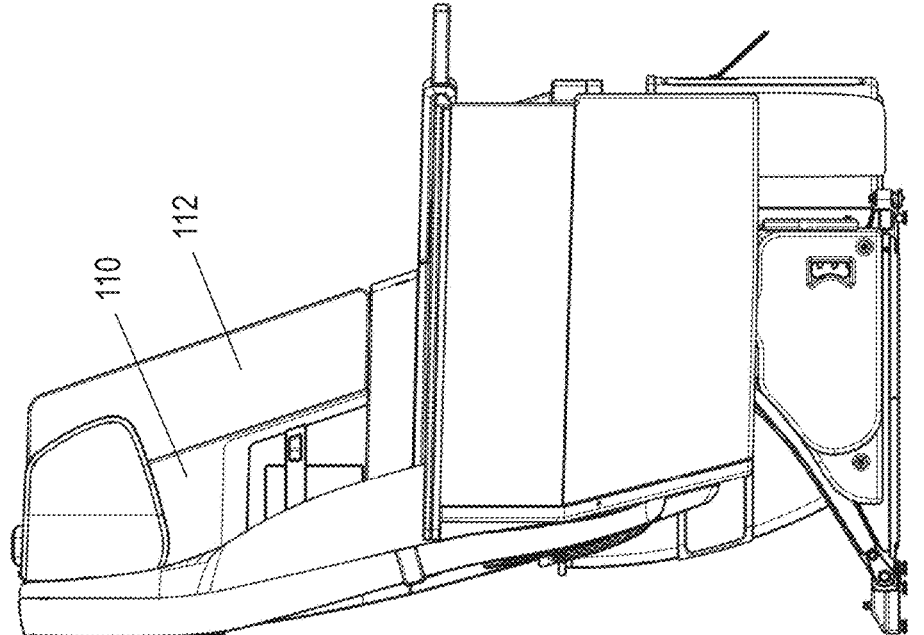
Figure 6:
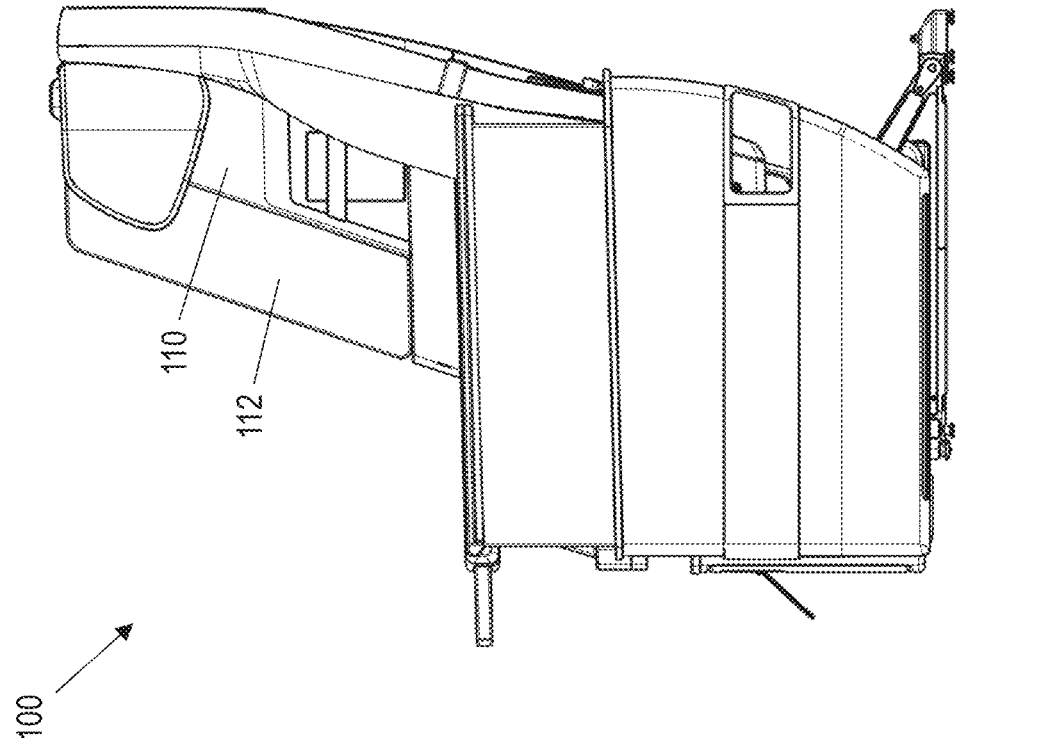
FIG. 6 is a right side view of the passenger seat assembly.
Figure 7:
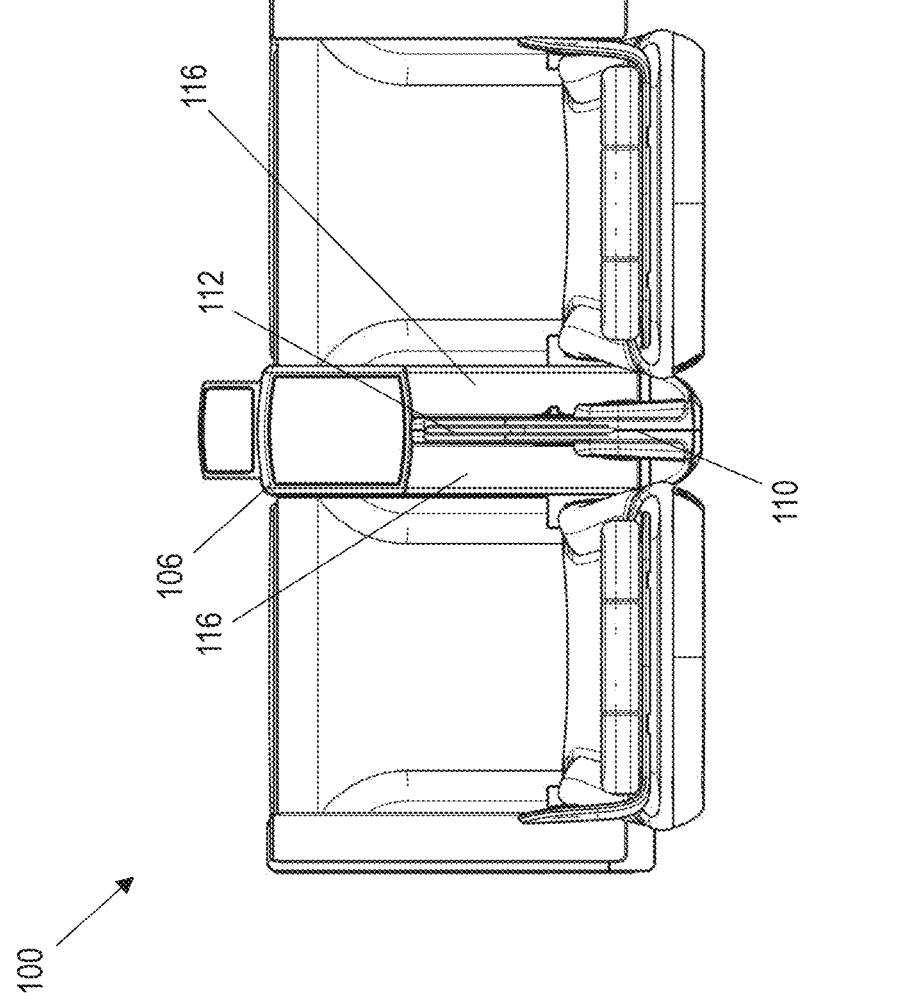
FIG. 7 is a top view of the passenger seat assembly.
Figure 8:
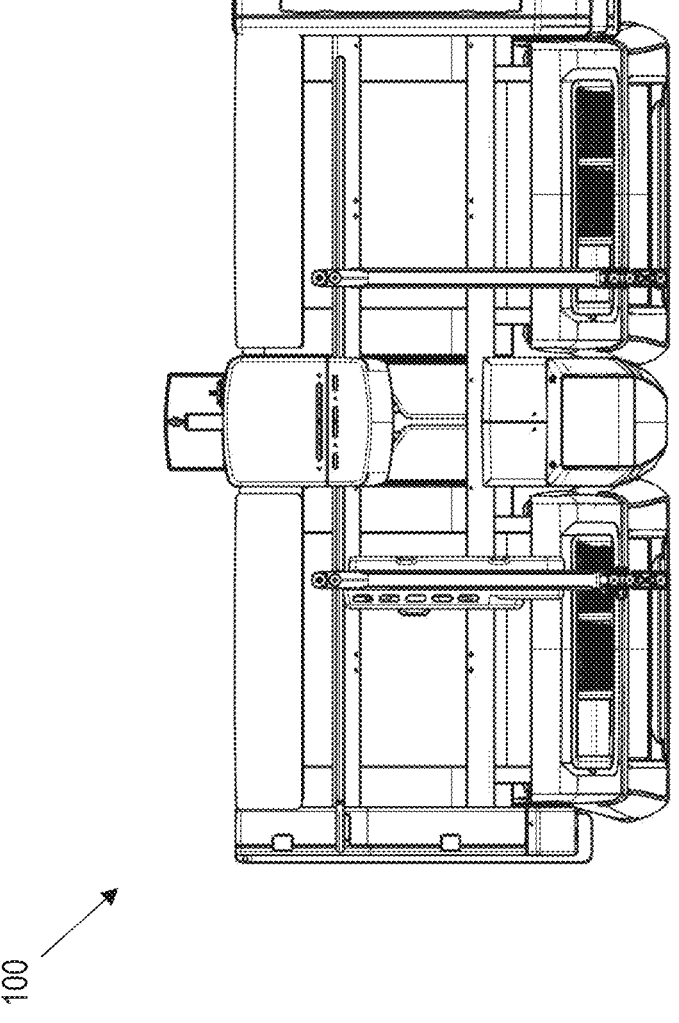
FIG. 8 is a bottom view of the passenger seat assembly.

FIGS. 3-8 illustrate the passenger seat assembly 100 from different angles to show the overall shape and footprint of the seat assembly 100. FIGS. 3 and 4 particularly illustrate the privacy between longitudinally adjacent like seat assemblies 100 provided by the combination of the center console 106 and the privacy divider 108. FIGS. 5 and 6 particularly illustrate the privacy between the seats provided by the upwardly extending portion 110 and the forward deployed portion 112 of the privacy divider 108. FIG. 7 particularly illustrates the first and second armrests 116 positioned atop the center console 106, and the separation of the armrests 116 by the upwardly extending portion 110 and forward deployed portion 112.

Figure 9:
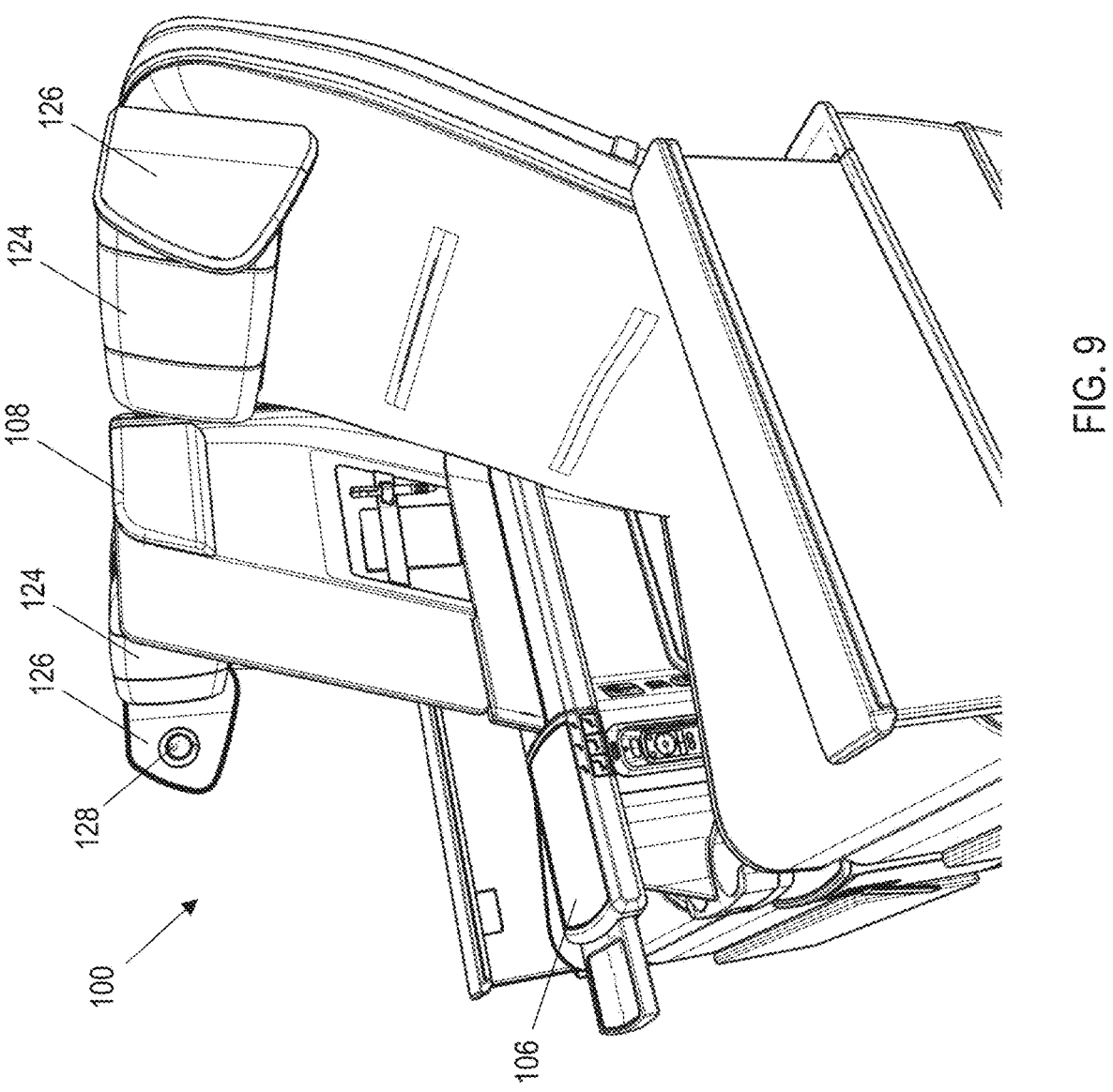
FIG. 9 is a fragmentary front view of the passenger seat assembly illustrating an asymmetrical headrest privacy assembly including an integrated reading light, in accordance with example embodiments of this disclosure.

FIG. 9 illustrates a particular configuration of the seat assembly 100 including the privacy divider 108 positioned atop the center console 106, and asymmetrical headrests 124 each including an outboard lateral privacy feature 126 and a reading light 128 mounted to the inboard side of the lateral privacy feature 126. The reading light 128 may be directable by the passenger.

Figure 10:
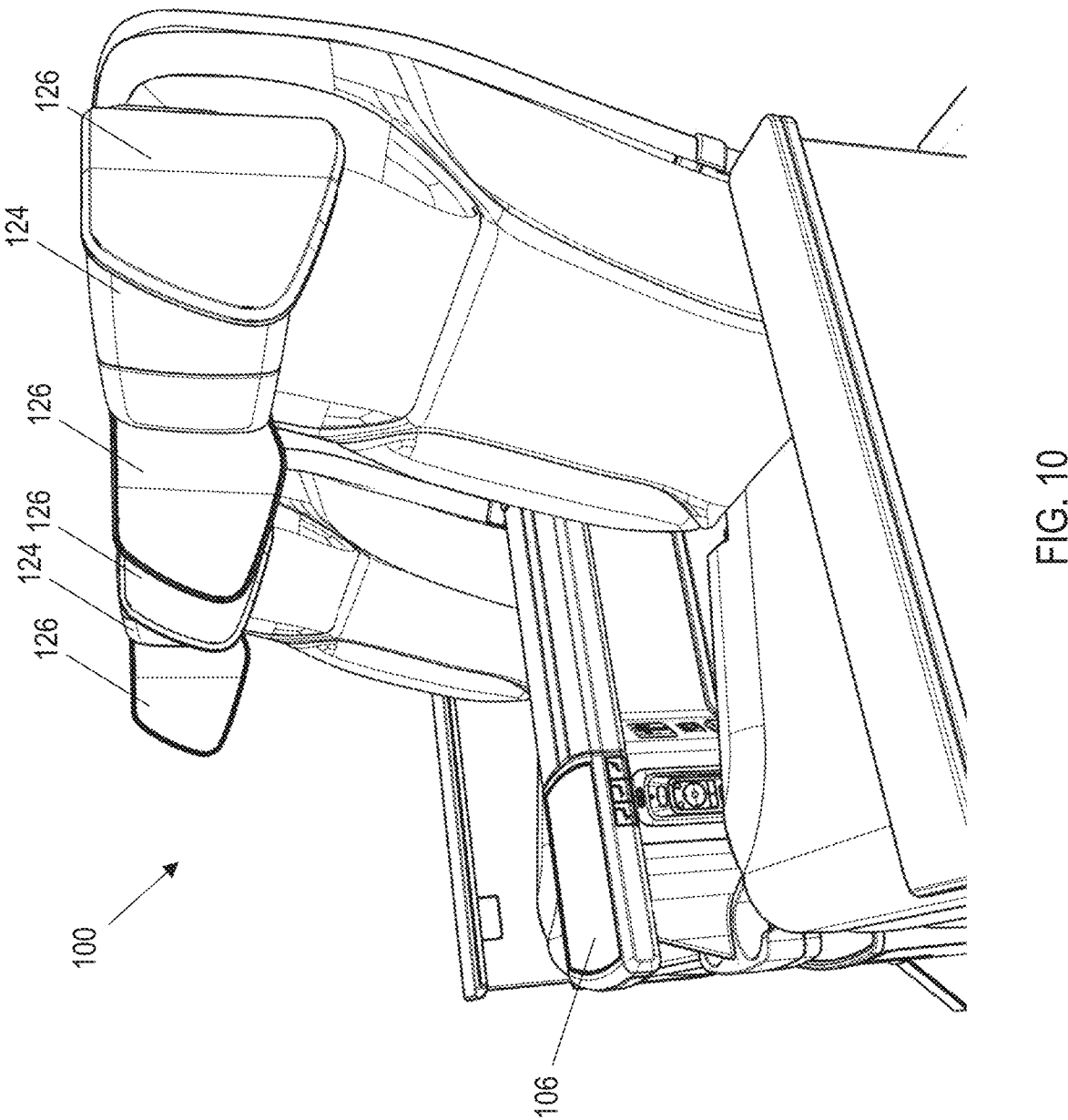
FIG. 10 is a fragmentary front view of the passenger seat assembly illustrating a symmetrical headrest privacy assembly, in accordance with example embodiments of this disclosure.

FIG. 10 illustrates another configuration of the seat assembly 100 including symmetrical headrests 124 each including an outboard lateral privacy feature 126 and an inboard lateral privacy feature 126 considering the lack of a privacy divider positioned atop the center console 106. Thus, in this configuration, privacy between seated passengers is provided by the inboard lateral privacy features and aisle privacy is provided by the outboard lateral privacy features. Although not shown, one or more of the inboard and outboard lateral privacy features may include a directable reading light.

Figure 11:
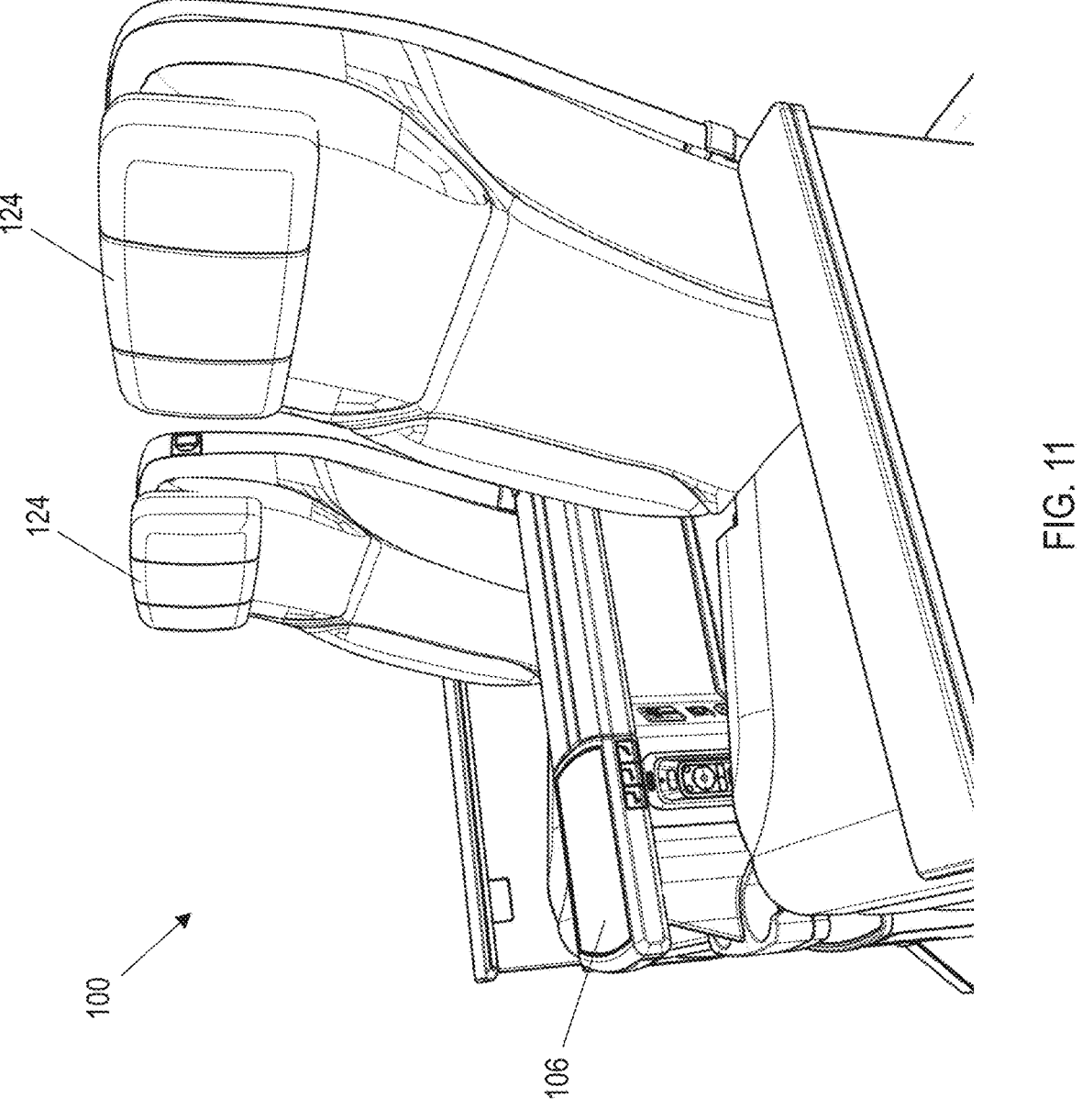
FIG. 11 is a fragmentary front view of the passenger seat assembly illustrating a headrest without a privacy feature, in accordance with example embodiments of this disclosure.
Figure 12:
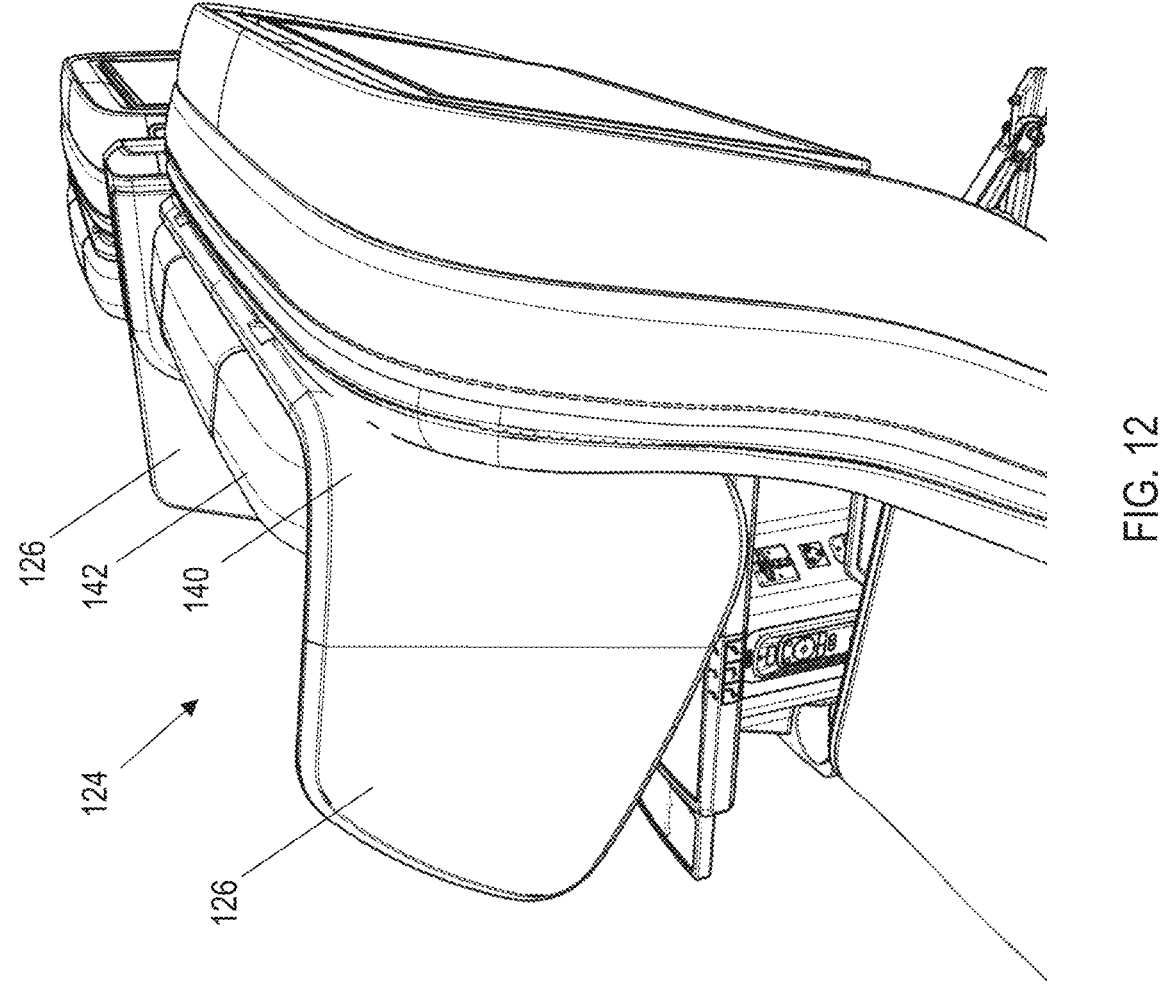
FIG. 12 is a fragmentary rear view of the passenger seat assembly including an asymmetrical headrest privacy feature, in accordance with example embodiments of this disclosure.
Figure 13:
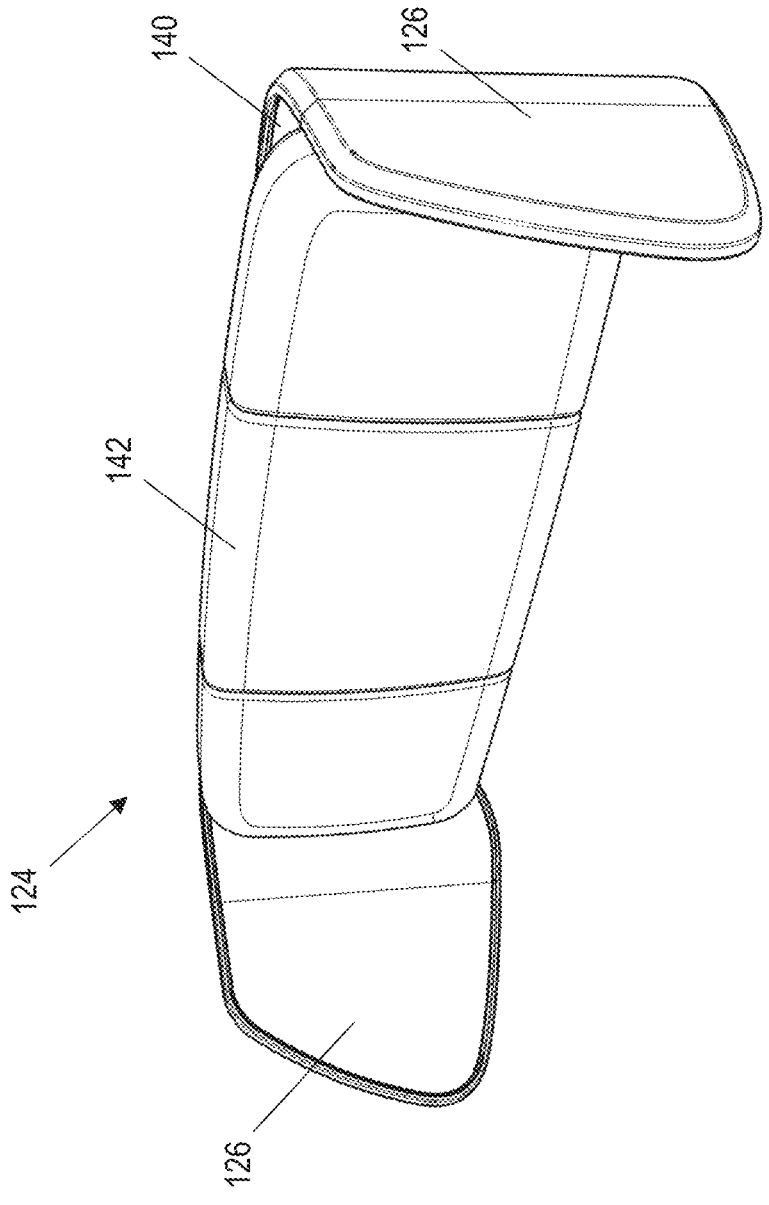
FIG. 13 is a front isometric view of a headrest and associated symmetrical headrest privacy assembly, in accordance with example embodiments of this disclosure.
Figure 14:
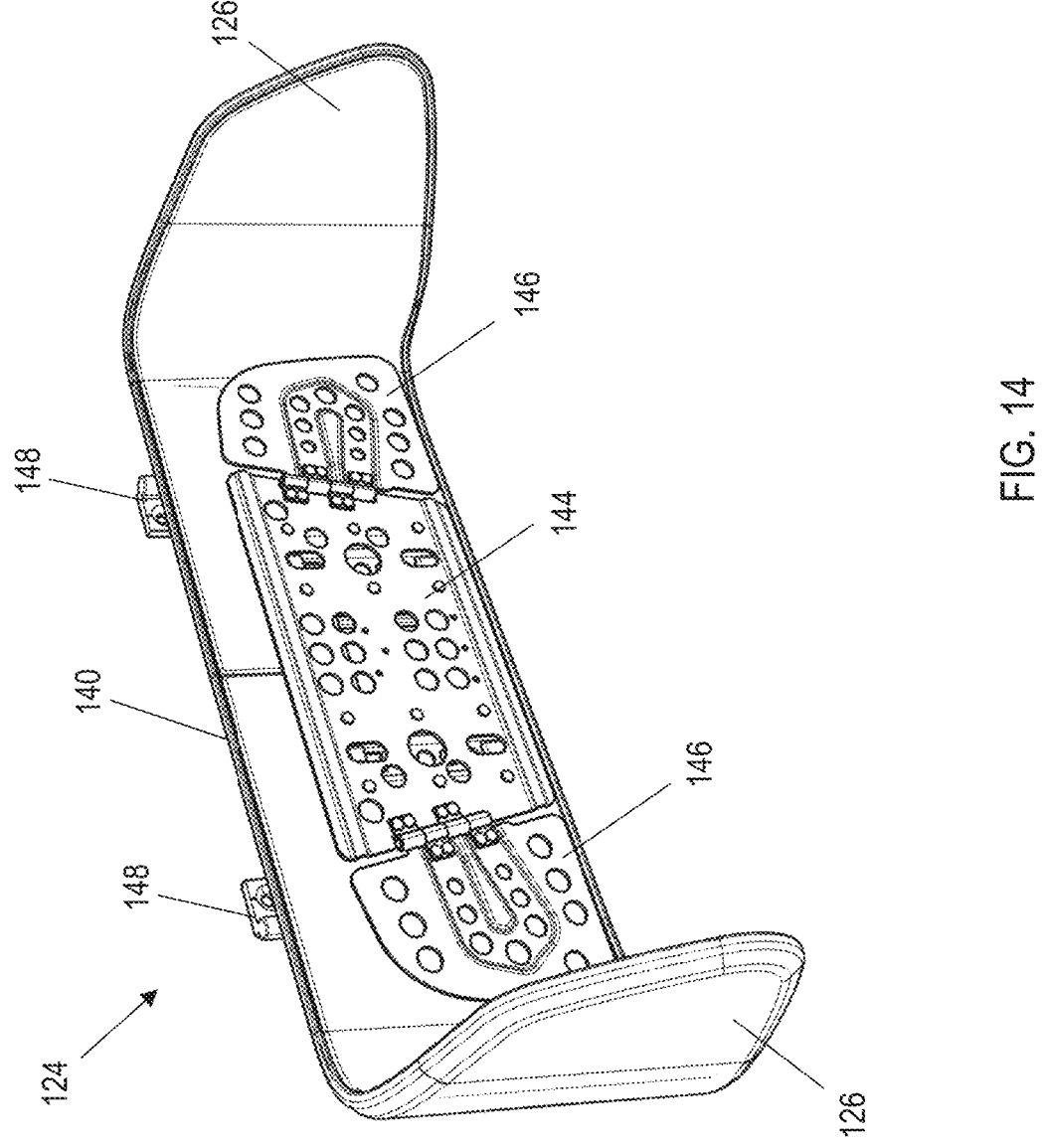
FIG. 14 is a front isometric view of a headrest illustrated mounted to a symmetrical headrest privacy assembly, in accordance with example embodiments of this disclosure.
Figure 15:
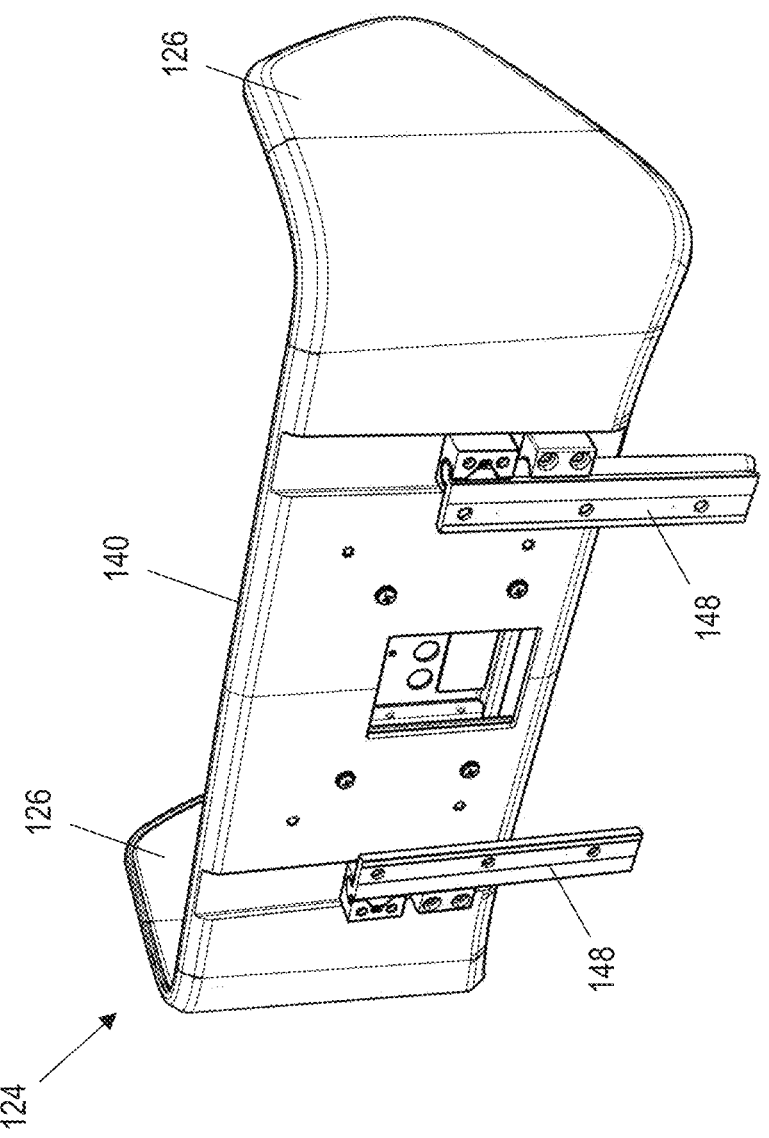
FIG. 15 is a rear isometric view of a symmetrical headrest privacy assembly illustrated movably mounted to vertical guide posts, in accordance with example embodiments of this disclosure.

FIG. 11 illustrates yet another configuration of the seat assembly 100 including padded headrests 124 each without any lateral privacy features, and without any privacy divider positioned atop the center console 106.

FIGS. 12-15 illustrate a particular conceived example of a symmetrical headrest 124 including a housing 140 defining inboard and outboard lateral privacy features 126, and a padded headrest 142 mounted to the front of and centered on the housing 140. The padded headrest 142 includes a frame having a fixed center portion 144 and left and right supports 146 pivotally attached to the fixed center portion 144. In use, each of the left and right supports 146 can be individually pivoted forward as a comfort or sleeping provision. In embodiments, the headrest 124 is coupled to vertical rails 148 on the backrest for vertical motion to adjust the headrest 124 up and down.

Figure 16:
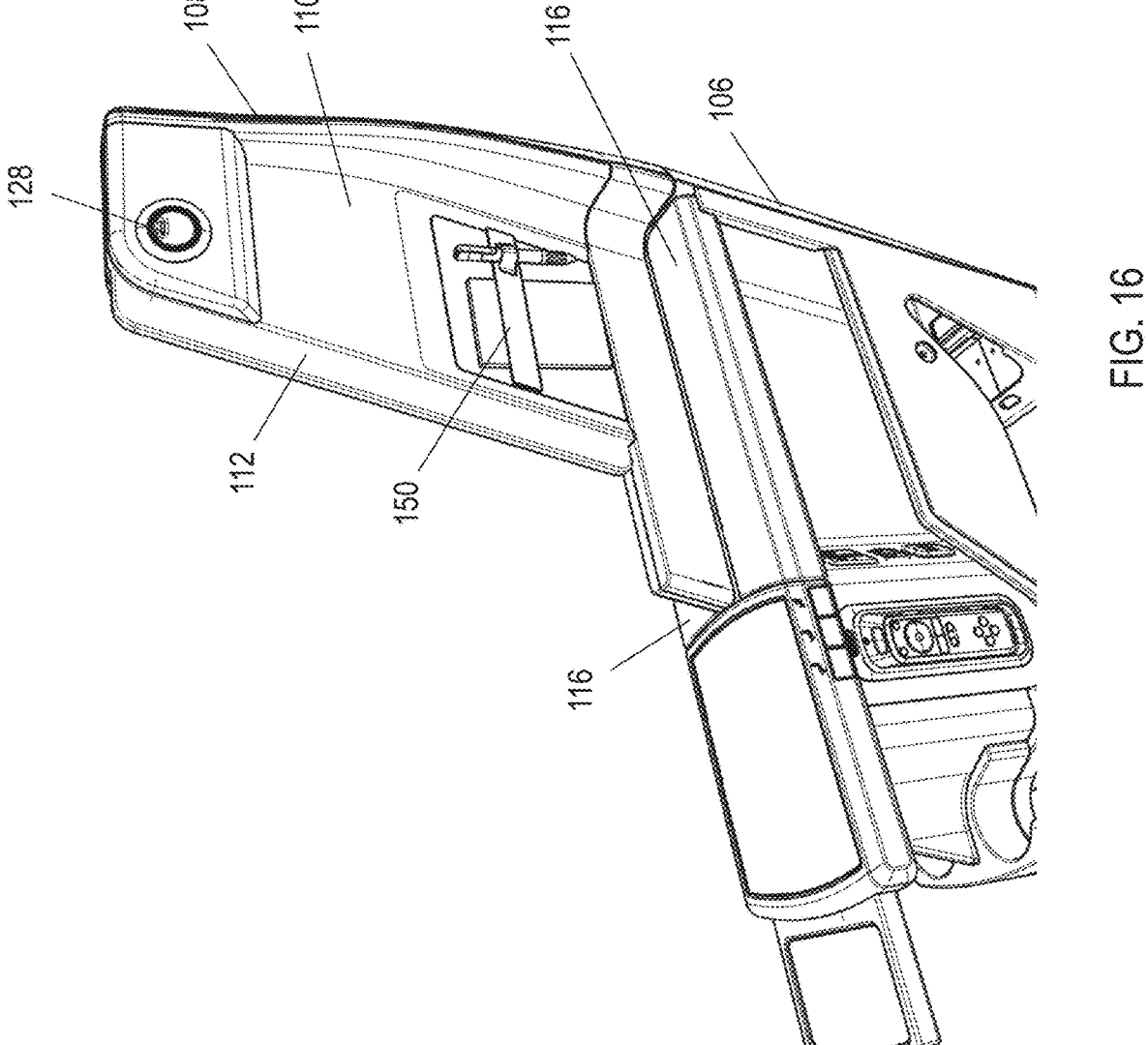
FIG. 16 is a fragmentary view of a center console including a featured privacy divider, in accordance with example embodiments of this disclosure.

FIG. 16 illustrates a particular conceived configuration of the center console 106 including the privacy divider 108. Each lateral side of the upwardly extending portion 110 may include a directable reading light 128 positioned above a notepad and writing utensil holder 150 including an elastic band attached at its opposing ends to the privacy divider 108 and including a loop. The forward deploying portion 112 is shown stowed, at least partly, within the upwardly extending portion 110. The base of the privacy divider bisects a portion of the top of the center console such that the armrests 116 serving the first and second seats are separate.

Figure 17:
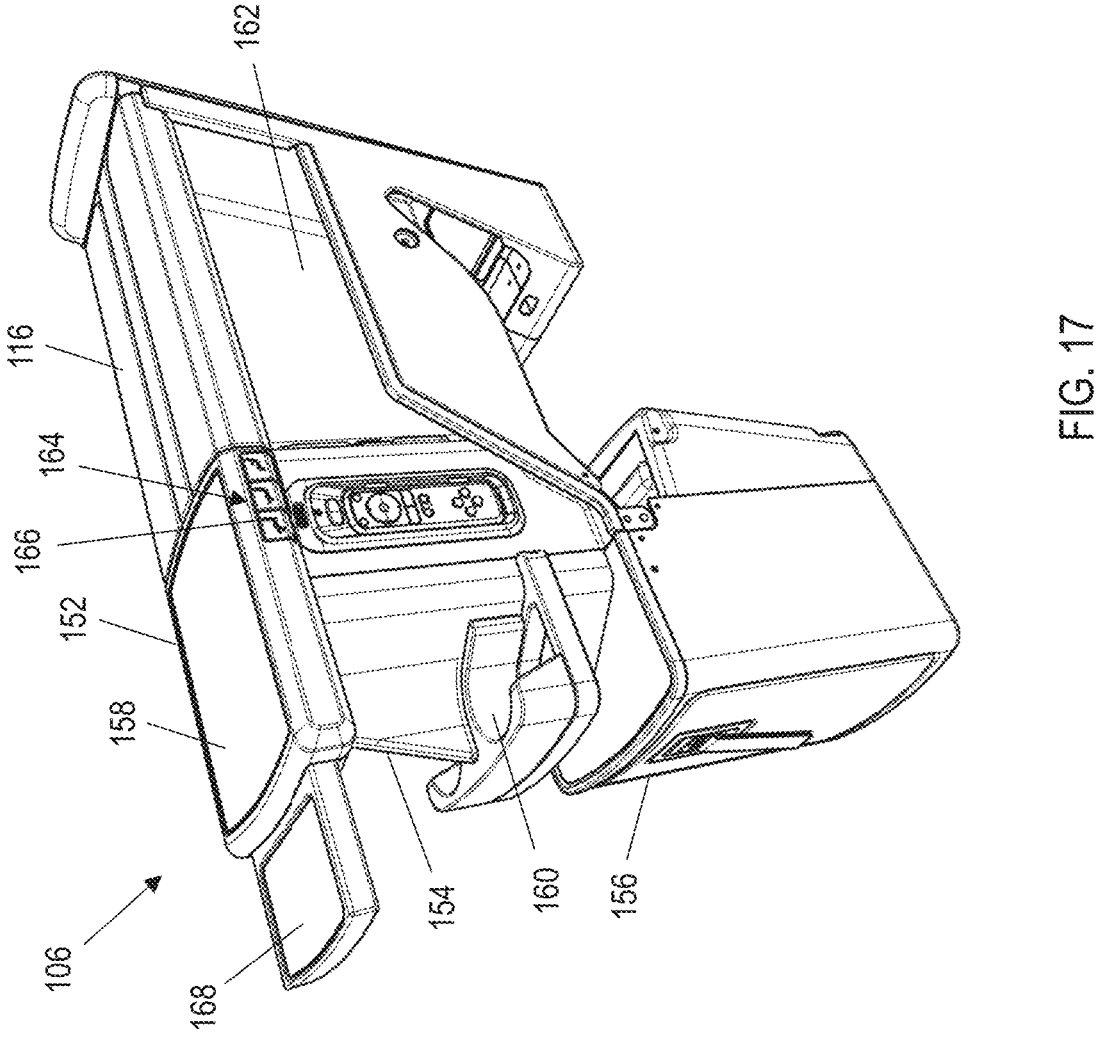
FIG. 17 is a front isometric view of a center console, in accordance with example embodiments of this disclosure.

FIG. 17 illustrates the center console 106 without the privacy divider. The center console 106 generally includes an upper console portion 152 and lower console portion 154. The longitudinal axis of the upper console portion 152 is oriented substantially horizontal, while the longitudinal axis of the lower console portion 154 is oriented substantially vertical. In some embodiments, the lower console portion 154 supports the upper console portion 152 from below. In some embodiments, at least portions of the upper console portion 152 and the lower console portion 154 may be integrally formed. Portions of the upper and lower console portions 152, 154 may be made from, for example, plastic due to its durability, light weight, ability to be colored, cleanability, etc.

As shown, the upper console portion 152 has a top, a front, a back, a first (e.g., left) lateral side, and a second (e.g., right) lateral side. The center console 106 may include additional console portions, for instance a base 156 configured to be attached to the floor. The top of the upper console portion 152 forms a substantially flat horizontal surface including a table 158 and the armrests 116. The table 158 may open to provide access to internal compartments formed in the interior space within the upper console portion 152. The armrest 116 may be provided as two laterally-adjacent armrests configured to rotate open. In some embodiments, the lower console portion 154 may include at least one cupholder 160 and at least one literature pocket 162 on each lateral side of the lower console portion 154.

In embodiments, a cable-actuated passenger control unit (PCU) 164 is positioned in interior space formed in the upper console portion 152. Mechanical pushbuttons 166 of the cable-actuated PCU 164 may be presented through one of the first and second lateral sides of the upper console portion 152. In this position, a passenger resting his/her arm on the armrest 116 is able to operate the pushbuttons 166 with their thumb for comfort and convenience. In the case of the center console 106, two cable-actuated PCUs 164 may be positioned in the interior space formed in the upper console portion 152 with the pushbuttons 166 of the first cable-actuated PCU 164 presented through the first lateral side, and the pushbuttons 166 of the second cable-actuated PCU 164 presented through the second lateral side. In some embodiments, the upper console portion 152 may be symmetrical about a vertical line of symmetry.

In embodiments, the width of the upper console portion 152 may be greater than the thickness of the upper console portion 152, and the height of the lower console portion 154 may be greater than the width of the lower console portion 154. In some embodiments, the thickness of the upper console portion 152 may be greater than the width of the lower console portion 154. In a particular embodiment, the upper console portion 152 may be from about 3 inches wide up to about 10 inches wide. In some embodiments, the upper console portion 152 may be no more than 5 inches thick, and more preferably no more than 3 inches thick.

In some embodiments, the first lateral side of the upper console portion 152 includes a first substantially vertical surface and a second inclined surface angled to face a seated passenger looking down at the console 106. The pushbuttons

166 may be presented through the substantially vertical surface. While three pushbuttons 166 are shown, the cable-actuated PCU 164 may include 1, 2, 3 . . . n number of pushbuttons 166 depending on the performance capabilities of the seat. Each pushbutton 166 may carry indicia schematically illustrating the predetermined function associated with that particular pushbutton 166. Indicia may be in the form of graphics, text, printing, labels, illumination, etc., conveying the predetermined function to the passenger. The center console 106 may further include a cocktail table 168 deployable through the front of the upper console portion 152. In embodiments, the cocktail table 168 may be spring-loaded and pushed to activate deployment via a spring force and pushed back into the upper console portion 152 to stow the cocktail table 168 and load the spring for the next deployment.

Figure 18:
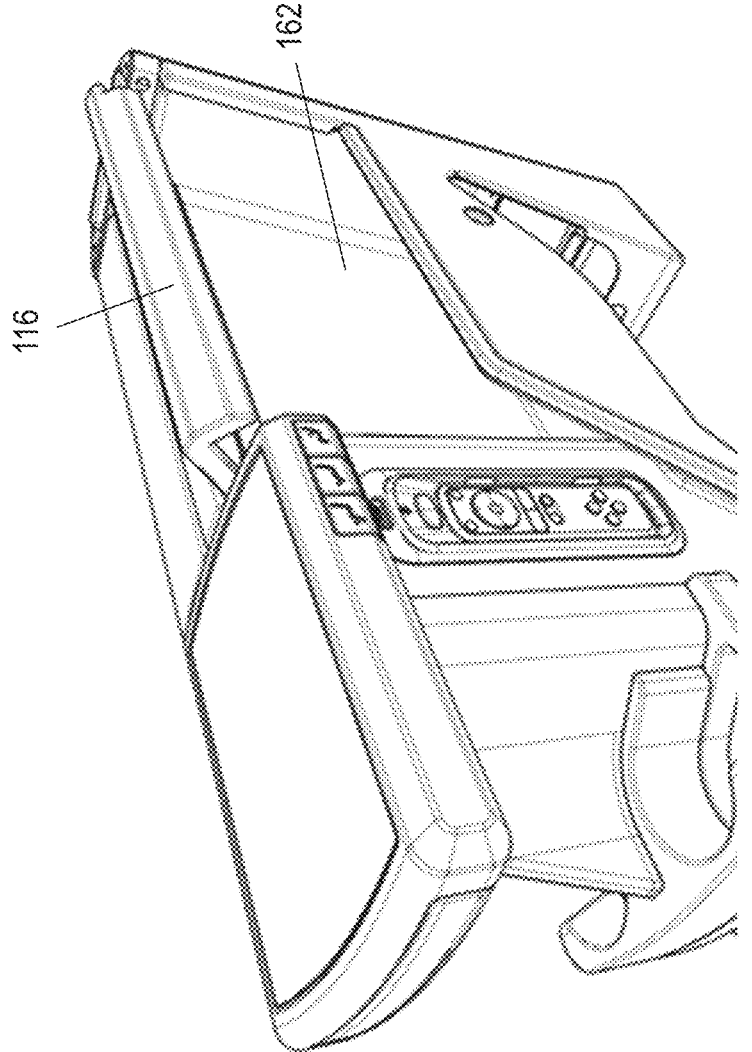
FIG. 18 is a fragmentary view of the center console illustrating console features, in accordance with example embodiments of this disclosure.

FIG. 18 illustrates an optional rotational capability of the armrests 116 and their positional relationship to the literature pocket 162 or other stowage compartment positioned below each armrest. In use, the armrest 116 may be rotated upward to gain better access to the literature pocket 162 or other stowage compartment.

Figure 19:
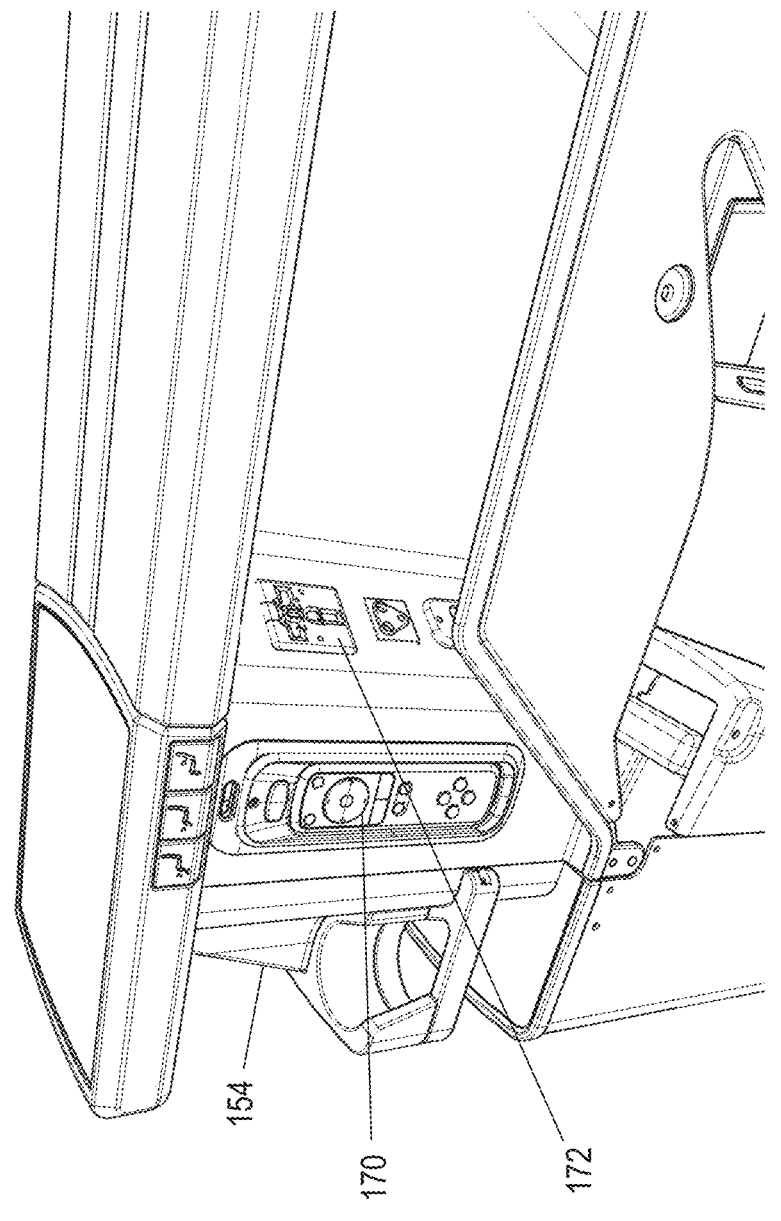
FIG. 19 is a fragmentary view of the center console illustrating console features, in accordance with example embodiments of this disclosure.

FIG. 19 illustrates further features of the center console, for instance a remote control 170 removably mounted on each lateral side of the lower console portion 154, and power and data ports 172 mounted in the storage space. The center console may be reconfigured to include one or more of the above-described convenience, electronic, comfort and privacy features.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft passenger seat assembly, comprising:
   a first passenger seat including a first headrest and a first privacy provision positioned on an outboard side of the first headrest;
   a second passenger seat including a second headrest and a second privacy provision positioned on an outboard side of the second headrest;
   a center console positioned between the first passenger seat and the second passenger seat, the center console including:
   a first armrest for the first passenger seat;
   a second armrest for the second passenger seat;
   a table positioned forward of the first and second armrests,
   a first cup holder positioned below the table and adjacent the first passenger seat; and
   a second cup holder positioned below the table and adjacent the second passenger seat; and
   an upwardly extending fixed privacy divider positioned atop the center console and between the first armrest and the second armrest;
   an upwardly extending movable privacy divider deployable in a forward direction relative to the upwardly extending fixed privacy divider;
   at least one first amenity mounted to a first side of the upwardly extending fixed privacy divider facing the first passenger seat; and at least one second amenity mounted to a second side of the upwardly fixed privacy divider facing the second passenger seat.

2. The aircraft passenger seat assembly according to claim 1, wherein: the at least one first amenity includes at least one of an article holder and a reading light; and the at least one second amenity includes at least one of an article holder and a reading light.

3. The aircraft passenger seat assembly according to claim 1, wherein the center console further comprises: a first open storage compartment positioned below the first armrest; and a second open storage compartment positioned below the second armrest.

4. The aircraft passenger seat assembly according to claim 3, further comprising:

a first remote control removably mounted to the first side of the center console and positioned below the fixed table;

at least one first power outlet mounted in the first open storage compartment;

a second remote control removably mounted to the second side of the center console and positioned below the fixed table; and at least one second power outlet mounted in the second open storage compartment.

5. The aircraft passenger seat assembly according to claim 1, further comprising:

a first vertically adjustable armrest positioned on an outboard side of the first passenger seat;

a second vertically adjustable armrest positioned on an outboard side of the second passenger seat;

an end bay positioned on an outboard side of the first passenger seat; and an elevated step mounted in the end bay.

6. The aircraft passenger seat assembly according to claim 1, further comprising a deployable table mounted in the center console, the deployable table deployable through a forward end of the table.

7. The aircraft passenger seat assembly according to claim 1, wherein:

the first and second passenger seats are positioned side-by-side and are parallel;

the first and second passenger seats are mounted on a frame assembly including transverse beams and legs for mounting the passenger seat assembly to a floor;

a first footwell is positioned under the first passenger seat;

a second footwell is positioned under the second passenger seat; and at least one amenity is mounted on a backside of each of the first passenger seat and the second passenger seat.

8. The aircraft passenger seat assembly according to claim 1, wherein:

the first privacy provision is a first headrest privacy assembly mounted behind the first headrest, the first headrest privacy assembly including at least one laterally positioned panel that extends forward past the first headrest; and the second privacy provision is a second headrest privacy assembly mounted behind the second headrest, the second headrest privacy assembly including at least one laterally positioned panel that extends forward past the second headrest.

9. An aircraft two-seat passenger seat assembly, comprising:

a first passenger seat having a first headrest and including a first privacy assembly positioned on an outboard side of the first passenger seat;

a second passenger seat having a second headrest and including a second privacy assembly positioned on an outboard side of the second passenger seat;

a center console positioned between the first passenger seat and the second passenger seat, the center console including:

a first armrest for the first passenger seat;

a second armrest for the second passenger seat;

a table positioned forward of the first and second armrests; and two cup holders positioned below the table; and an upwardly extending fixed privacy divider positioned atop the center console and between the first armrest and the second armrest;

an upwardly extending movable privacy divider deployable in a forward direction relative to the upwardly extending fixed privacy divider;

at least one first amenity mounted to a first side of the upwardly extending fixed privacy divider facing the first passenger seat; and at least one second amenity mounted to a second side of the upwardly fixed privacy divider facing the second passenger seat.

10. The aircraft two-seat passenger seat assembly according to claim 9, wherein the center console further comprises:

a first open storage compartment positioned below the first armrest; and a second open storage compartment positioned below the second armrest.

11. The aircraft two-seat passenger seat assembly according to claim 9, further comprising:

a first vertically adjustable armrest positioned on an outboard side of the first passenger seat;

a second vertically adjustable armrest positioned on an outboard side of the second passenger seat;

an end bay positioned on an outboard side of the first passenger seat; and an elevated step mounted in the end bay.

12. The aircraft two-seat passenger seat assembly according to claim 9, further comprising a deployable table mounted in the center console, the deployable table deployable through a forward end of the table.

13. The aircraft two-seat passenger seat assembly according to claim 9, wherein:

the first privacy assembly includes at least one laterally positioned panel that extends forward past the first headrest; and the second privacy assembly includes at least one laterally positioned panel that extends forward past the second headrest.

* * * * *